Nov. 1, 1955 A. H. SYKES 2,722,293
BRAKE SHOE AND LINING
Filed Dec. 12, 1952

Allen H. Sykes
INVENTOR.

United States Patent Office 2,722,293
Patented Nov. 1, 1955

2,722,293

BRAKE SHOE AND LINING

Allen H. Sykes, Dover, Tenn.

Application December 12, 1952, Serial No. 325,607

1 Claim. (Cl. 188—244)

The present invention relates to a friction brake shoe and complemental lining therefor and more particularly to certain new and useful improvements not found, it is believed, in structurally analogous prior art constructions.

One object of the invention is to dispense with the need for rivets and similar fastenings and to, in this manner, promote an appreciable saving of time and money and to obviate the need for punches and riveting machines and the expense and time involved in connection therewith.

Another object of the invention is to provide a lining which is imperforate and therefore provides a more extensive friction braking surface, resulting in longer life for all parts and insuring more effective and reliable braking power.

A highly important object is to provide a brake shoe which has an open ended channel into which the brake band is slipped in an endwise manner and is then amply clamped in place, whereby to render the job of removing an old lining and replacing it with a new one both easy and simple of accomplishment, much to the satisfaction of brake service men and with a resultant saving to owners of automobiles and equivalent vehicles.

Another object appertains to a brake shoe and complemental lining assembly wherein the transverse ends as well as the entire longitudinal edge portions of the lining are securely anchored on the brake shoe in order to insure reliable and instant braking results and to eliminate the possibility of the surface of the brake drum becoming scored or otherwise damaged by constant application of the brakes.

An equally important object is to structurally, functionally, and otherwise improve upon similarly constructed and performing brake shoe and lining assemblies and in doing so to insure the accomplishment of benefits which will accrue to manufacturers, truck and cab companies and which will appeal to members of the armed forces due to the fact that quick-change results with effective braking power may at all times be assured.

Briefly summarized, one phase of the invention has to do with a brake shoe having a lengthwise channel open at at least one end, an insertable and removable friction brake lining of usual elongate single strip form fitting in and commensurate in length with said channel, and a readily attachable and detachable hold-down cleat removably fastened on said shoe at the open end of said channel and clamped against and holding the cooperating end of said lining operatively in its intended position for use.

Further novelty is predicated on the stated construction and combination therewith of an abutment affixed to the shoe at the other end of the channel and transversely bridging said other end, the corresponding end of said lining having retentive engagement with said abutment.

In addition, novelty is predicated on an article of manufacture characterized by a longitudinally bowed brake shoe having a portion which is channel-shaped in cross-section, the channel being open at one end and provided at the other end with a transverse abutment having an undercut surface providing a bevel, the opposed inward surfaces of the side walls of the channel being undercut and providing lengthwise V-shaped open ended keyways, a readily attachable and detachable cleat, and bolt and nut means removably securing said cleat to the shoe at the open end of said channel.

Finally, novelty is also based on a brake lining, as a new article of manufacture, a brake lining of elongated strip form having outstanding longitudinal flanges and transverse end flanges, said flanges being generally V-shaped in cross-section and of a thickness appreciably less than the body portion of the strip, the latter being wholly imperforate.

Other objects, features, and advantages will become more readily apparent from the following description and the accompanying sheet of drawings.

Figure 2:
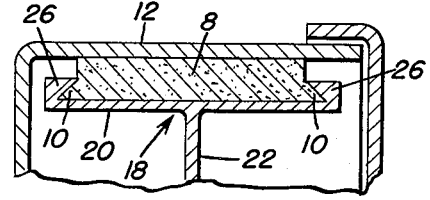
Figure 2 is an enlarged cross-section on the plane of the line 2—2 of Figure 1 looking in the direction of the arrows.
Figure 3:
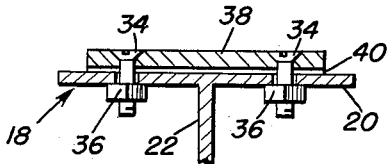
Figure 3 is a similar cross-section on the line 3—3 of Figure 1 looking in the direction of the arrows and with the brake drum omitted.
Figure 4:
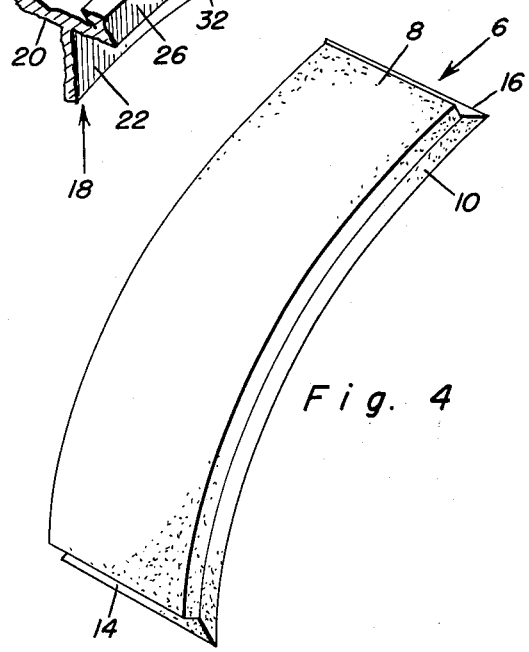
Figure 4 is a perspective view of the improved lining by itself.

With reference first to Figure 4, the brake lining, as a unit, is denoted by the numeral 6. It is of customary brake lining material and is elongated, rectangular in cross-section and is characterized by an imperforate body portion 8. The longitudinal side flanges are denoted by the numerals 10—10 and they are beveled and therefore substantially V-shaped in cross-section. The bottoms of the flanges are flush with the bottom or underside of the lining proper. The cross sectional thickness of the body is approximately twice that of the thickness of the flanges and therefore the body provides an effective surface for coaction with the friction surface of the drum, as at 12, in Figure 2. There are also transverse or end flanges and these are denoted by the numerals 14 and 16 and they too are V-shaped or approximately so in cross-section and to distinguish from the other flanges there is said to be outwardly and downwardly beveled. As a further distinction, the lengthwise flanges 10—10 are referred to alternatively as keying flanges.

Figure 1:
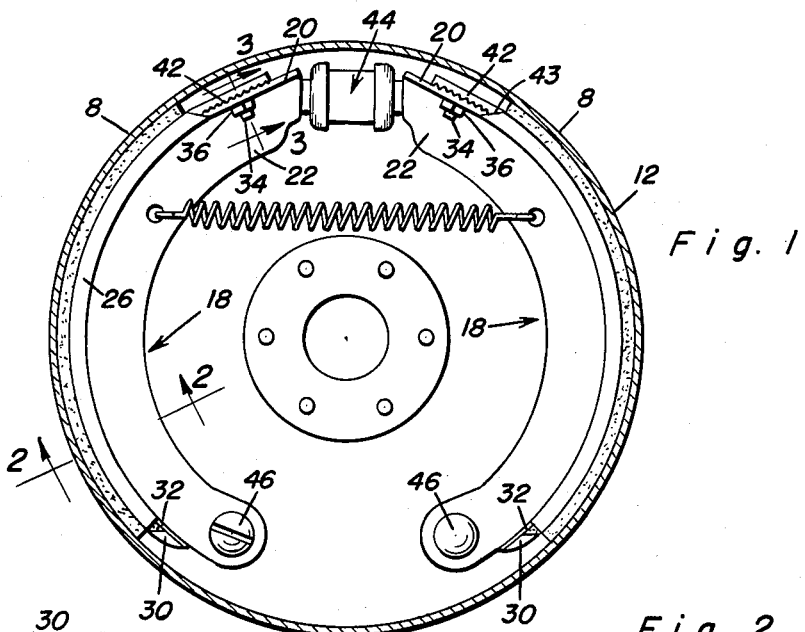
Figure 1 is a view in section and elevation showing a complete operative brake construction wherein each brake shoe and its lining is constructed in accordance with the principles of the present invention.
Figure 5:
Figure 5 is a fragmentary perspective view of one end portion of the brake shoe with the lining omitted.
Figure 5:
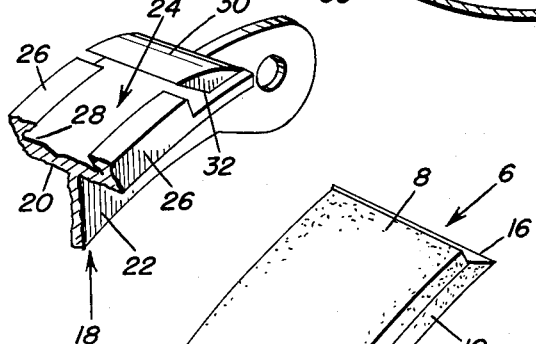

The brake shoe is denoted by the numeral 18 and comprises a plate portion 20 and a lengthwise rib portion 22. As before stated, the effective surface of the plate is formed with an open ended lengthwise channel denoted by the numeral 24. The upstanding side walls of the channel 26—26 have their inner opposed faces undercut to provide substantially V-shaped keying grooves or keyways 28 to accommodate and properly seat and retain the keying flanges 10. The lower end of the channel while partly open, is more satisfactorily thought of as partly closed by a transverse abutment 30 having an undercut portion 32 providing a bevel. The brake lining is slipped through the channel with the flanges 10—10 fitted into the keyways and with the beveled end 14 fitted beneath the beveled portion or shoulder 32 of the abutment. At the opposite normally open end of the channel, the channel walls are beveled and the plate portion, without walls, is provided with bolt holes to accommodate bolts 34—34 and nuts 36—36 which serve to hold the attachable and detachable cleat 38 in place. The cleat has anti-slipping teeth or serrations 40 bound firmly against the plate by the duly tightened bolts. The cleat also has a beveled shoulder or surface as at 42 and this overlaps the beveled end flange 16. The structure seen in Figure 1 comprises a brake drum and shows the usual hydraulic cylinder means 44 and the brake shoes pivoted in place as at 46—46. The novelty is, however, in the specific construction of the brake shoe and the lining with the parts considered singularly and collectively.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In combination, a longitudinally bowed brake shoe essentially channel-shaped in cross-section, the channel portion thereof being unobstructedly open at one end and provided at the other end with an integral transverse abutment having an undercut surface providing a bevel, the opposed inward surfaces of the side walls of the channel portion being undercut and providing lengthwise V-shaped open-ended keyways, a readily attachable and detachable cleat, and bolt and nut means removably securing said cleat to the shoe at the open end of said channel, the portion of the cleat which is adapted to clampingly bind a brake lining in place being bevelled, and an insertable and removable one-piece brake lining of a length and width commensurate with the length and width dimensions of the channel-shaped portion of the shoe and having outstanding longitudinal marginal flanges and transverse end flanges, all of said flanges being reduced in cross-section and substantially V-shaped in cross-section, said lining being wholly imperforate and fitting into the channel portion with one transverse flange interposed between the bevel of the abutment and cooperating body portion of the shoe, with the longitudinal flanges keyed in said keyways, with the remaining transverse flange held in position by the cooperating edge portion of said cleat, said abutment having its undercut beveled surface spaced from the adjacent end of the channel portion.

References Cited in the file of this patent

UNITED STATES PATENTS

| 1,246,386 | Bly | Nov. 13, 1917 |
| 1,716,393 | Thompson | June 11, 1929 |
| 1,749,901 | Brownyer | Mar. 11, 1930 |
| 1,896,013 | Reasoner | Jan. 31, 1933 |

FOREIGN PATENTS

| 3,990 | Great Britain | Aug. 17, 1883 |
| 127,458 | Austria | Mar. 25, 1932 |
| 356,876 | France | Oct. 20, 1905 |
| 757,380 | France | Oct. 9, 1933 |